2,943,079
VULCANIZING RUBBER WITH PROPYNYL SULFENAMIDES

John J. D'Amico, Nitro, W. Va., assignor to Monsanto Chemical Company, St. Louis, Mo., a corporation of Delaware No Drawing. Filed Sept. 2, 1958, Ser. No. 758,573

12 Claims. (Cl. 260—79.5)

The present invention relates to the vulcanization of rubber employing as accelerators a class of new chemical products. The accelerators may be described broadly as thiazolesulfenamides and can be schematically represented by the general formula

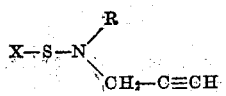

wherein X represents an aryl thiazole nucleus which may contain a nitro, chlor, phenyl, methoxy, alkoxy or alkyl group substituted in the benzene ring, and R represents hydrogen, an alkyl, alkenyl, aralkyl or a cycloalkyl group. Preferably, the alkyl group mentioned contains from one to and including five carbon atoms, such as methyl, ethyl, propyl, isopropyl, butyl, isobutyl, and amyl groups. A preferred method of obtaining the new products is set forth in the following examples of the invention.

EXAMPLE 1—PRODUCT A

*N-isopropyl-N-(2-propynyl)-2-benzothiazolesulfenamide*

A solution of the sodium salt of 2-mercaptobenzothiazole was prepared by dissolving 43 parts (0.25 mole) of 97% mercaptobenzothiazole in 50 parts of water containing 40 parts (0.25 mole) of 25% sodium hydroxide solution. The solution preferably is filtered to remove any insoluble particles therefrom. Thereupon 97.2 parts (1.0 mole) of N-isopropyl-2-propynylamine were added over a period of time while agitating the mixture. When all of the amine had been added, 60 parts of 25% sulfuric acid were slowly added with stirring until thorough admixture resulted. Next 22.3 parts (0.3 mole) of sodium hypochlorite contained in 150 parts of water were added slowly while maintaining the temperature of the mass between 25–30° C. by suitable cooling means as required. Agitation was continued for about an hour after all the hypochlorite had been added. Then 2 parts of sodium sulfite were added to remove any unreacted oxidizing agent from the reaction. The reaction mixture was then extracted with a suitable solvent, such as ether, in which any by-product di- or polysulfide are insoluble, the extract was filtered and the ether solution washed with water to neutrality of the water washings. The extract was then dried by means of anhydrous sodium sulfate to remove any water droplets present and the ether was then removed in vacuo at a temperature below 30° C. A semi-solid which was dark amber in color was obtained in 54.8% yield. The product was soluble in acetone, ether, benzene, chloroform, ethanol, ethyl acetate, and heptane. The expected product, of empirical formula $C_{13}H_{14}N_2S_2$, was confirmed by analysis for nitrogen content which showed 10.41% present as compared with 10.67% required for the formula shown.

EXAMPLE 2—PRODUCT B

*5-chloro-N-isopropyl-N-(2-propynyl)-2-benzothiazole-sulfenamide*

Proceeding in the manner as described in Example 1 except that 50.4 parts of 5-chloromercaptobenzothiazole in 100 parts of water were used in place of the mercaptobenzothiazole there employed, and treating the product as there described, a tan colored solid product, M.P. 43–45° C., was obtained in 54% yield which possessed the same characteristics in solvents as the product of Example 1. Identification of the product of this example was confirmed by analysis as possessing the formula $$C_{13}H_{13}ClN_2S_2$$

as is evident from the results that follow:

|  | Percent Found | Percent Theory |
|---|---|---|
| nitrogen | 9.80 | 9.44 |
| chlorine | 12.41 | 11.94 |

EXAMPLE 3—PRODUCT C

*N-isopropyl-4-methyl-N-(2-propynyl)-2-benzothiazole-sulfenamide*

As another example of the invention, the product named immediately above was obtained by forming a solution of 45.3 parts (0.25 mole) of 4-methyl mercaptobenzothiazole in 25 parts of water containing 40 parts (0.25 mole) of 25% sodium hydroxide. Thereupon, 121.0 parts (1.25 mole) of N-isopropyl-2-propynylamine were slowly added with thorough agitation whereupon 50 parts of 25% sulfuric acid were added over a period of time and then 22.5 parts of sodium hypochlorite solution (0.3 mole as a 16.1% solution) were slowly added while maintaining the temperature of the mixture between 25–30° C. Agitation was continued for about an hour after all the reactants had been added. Thereupon, 4 parts of sodium sulfite were added to destroy any residual oxidizing agent present. After cooling to a maximum temperature of 25° C. the mass was extracted with ether, the ethereal solution was filtered, washed with water to neutrality, dried and the solvent removed as described in Example 1. An amber colored oil was obtained in 69.5% yield. This product was soluble under the same conditions as was Product A. Identification of the product as $C_{14}H_{16}N_2S_2$ and as named in this example was confirmed by analysis which produced as results:

|  | Percent Found | Percent Theory |
|---|---|---|
| nitrogen | 9.91 | 10.15 |

EXAMPLE 4—PRODUCT D

*6-ethoxy-N-isopropyl-N-(2-propynyl)-2-benzothiazole-sulfenamide*

Again proceeding as described in Example 3 hereof, but using 52.8 parts (0.25 mole) of 6-ethoxy mercaptobenzothiazole in place of the 4-methyl mercaptobenzothiazole used in the said example and maintaining the reaction temperature at 45–50° C., there was obtained a cream colored solid melting at 90–91° C. after recrystallization from ethyl alcohol. It displayed the same characteristics in solvents as pointed out in the three previous examples. The product was identified as the one named in this example by analysis, confirming the formula $C_{15}H_{18}N_2OS_2$ as is shown from the results:

|  | Percent Found | Percent Theory |
|---|---|---|
| nitrogen | 9.17 | 9.14 |
| sulfur | 20.70 | 20.93 |

EXAMPLE 5—PRODUCT E

*N-tert. butyl-N-(2-propynyl)-2-benzothiazolesulfenamide*

Again proceeding as described in Example 3 hereof, but using 97% mercaptobenzothiazole in place of the 4-methyl mercaptobenzothiazole and using 111.2 parts (1.0 mole) of N-tert. butyl-2-propynylamine instead of the N-isopropyl-2-propynylamine in that example and maintaining the reaction temperature at 45–50° C., there was obtained a viscous amber oil. The product, of empirical formula $C_{14}H_{16}N_2S_2$, was confirmed by analysis as is evident from the results that follow:

|  | Percent Found | Percent Theory |
|---|---|---|
| nitrogen | 9.86 | 10.14 |
| sulfur | 22.83 | 23.20 |

EXAMPLE 6—PRODUCT F

*N-cyclohexyl-N-(2-propynyl)-2-benzothiazole-sulfenamide*

This example, prepared as in Example 3 above, employed 99.8% mercaptobenzothiazole and N-cyclohexyl-2-propynylamine. The reaction temperature was maintained at 45–50° C. and a semi-solid was obtained in 49% yield. The expected product, of empirical formula $C_{16}H_{18}N_2S_2$, was confirmed by analysis for nitrogen content which showed 9.00% present as compared with 9.26% required for the formula shown.

Further examples of the new compounds comprise N-methyl-N-(2-propynyl)-2-benzothiazolesulfenamide, N-ethyl-N-(2-propynyl)-2-benzothiazolesulfenamide, N-isobutyl-N-(2-propynyl)-2-benzothiazolesulfenamide, N-isoamyl-N-(2-propynyl)-2-benzothiazolesulfenamide, N-benzyl-N-2-(propynyl)-2-benzothiazolesulfenamide and N-allyl-N-(2-propynyl)-2-benzothiazolesulfenamide. Most of the intermediates required have been described and others may be prepared by application of known principles. For example, N-isopropyl-2-propynylamine may be prepared as follows: To a stirred solution containing 591 grams (10.0 moles) of isopropylamine and 400 ml. of water, 5 moles of 3-bromo-1-propyne was added dropwise at 47–65° C. over a three hour period. The stirred reaction mixture was heated at 60–70° C. for four hours. After cooling to 10° C., 500 grams of 50% aqueous sodium hydroxide was added over a ten minute period. The reaction mixture was stirred for one additional hour and the sodium halide was removed by filtration. The top organic layer was dried over caustic and excess isopropylamine was removed by distillation. The distillation of the residue through a 4-foot Vigreux-type column gave N-isopropyl-2-propynylamine, B.P. 110–111° C., $N_D^{25}$ 1.4230, analyzing 14.54% nitrogen as compared to 14.42% calculated for $C_6H_{11}N$. Boiling points of other typical amines apparently not heretofore reported are:

N-allyl-2-propynylamine _____ 123° C. at 760 mm.
N-tert. butyl-2-propynylamine __ 127–129° C. at 760 mm.
N-cyclohexyl-2-propynylamine _ 98–100° C. at 30 mm.

The products of the present invention as described hereinbefore have been found effective as accelerators of the vulcanization of rubber as shown by the following examples which are typical of the class of products. Mixes were prepared in the well known manner according to the recipes shown below:

| Stock | A | B | C |
|---|---|---|---|
|  | Parts by weight | | |
| Smoked sheets rubber | 100 | 100 | 100 |
| Carbon black (Philblack O) | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| N,N'-Dinitroso-diphenyl-p-phenylenediamine | 1.5 | 1.5 | |
| Product A | 0.5 | | |
| Product B | | 0.5 | |
| Product C | | | 0.5 |

The stocks so compounded were cured in the usual manner by heating in a press for different periods of time at 144° C. The physical properties of the vulcanizates are set forth below:

TABLE I

|  | Time of Cure | Stock A | Stock B | Stock C |
|---|---|---|---|---|
| Modulus of Elasticity in lbs./in.² at 300% elongation | 30 | 1,930 | 1,720 | |
|  | 45 | 2,470 | 2,490 | 2,160 |
|  | 60 | 2,470 | 2,430 | 2,110 |
| Tensile at break in lbs./in.² | 30 | 3,620 | 3,300 | |
|  | 45 | 3,460 | 3,780 | 3,540 |
|  | 60 | 3,710 | 3,660 | 3,340 |
| Mooney scorch at 135° C., mins. for 10 point rise above minimum value | | | 28 | 22.8 | ¹ 36.6 |

¹ Determined at 121° C.

As further examples of the invention mixes were prepared comprising:

| Stock | D | E | F |
|---|---|---|---|
|  | Parts by weight | | |
| Smoked sheets rubber | 100 | 100 | 100 |
| Carbon black (Philblack O) | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| Antioxidant | | 1.5 | 1.5 |
| Product D | 0.5 | | |
| Product E | | 0.5 | |
| Product F | | | 0.5 |

Stock E contained 6-dodecyl-1,2-dihydro-2,2,4-trimethylquinoline and Stock F contained phenyl-beta-naphthylamine as the antioxidant. The stocks so compounded were cured in the usual manner by heating in a press for different periods of time at 144° C. The physical properties of the vulcanizates are set forth below:

TABLE II

|  | Time of Cure | Stock D | Stock E | Stock F |
|---|---|---|---|---|
| Modulus of Elasticity in lbs./in.² at 300% elongation | 30 | 1,940 | 1,850 | 1,920 |
|  | 45 | 1,960 | 2,170 | 2,100 |
|  | 60 | 1,930 | 2,080 | 2,100 |
| Tensile at break in lbs./in.² | 30 | 3,820 | 3,860 | 4,220 |
|  | 45 | 3,740 | 4,050 | 4,110 |
|  | 60 | 3,540 | 3,700 | 3,990 |
| Mooney scorch at 135° C., mins. for 10 point rise above minimum value | | 11.8 | 10.8 | 13 |

Another characteristic test was carried out in which Product A was tested in a typical tread stock comprising 100 parts of smoked sheet rubber, 50 parts of carbon black (Philblack 0), 5 parts of zinc oxide, 3 parts of stearic acid, 3 parts of saturated hydrocarbon softener, 2.5 parts of sulfur, 0.5 part of Product A, and 1.5 parts of N-nitroso diphenylamine, a retarder particularly effective with sulfenamide accelerators. The stock was cured for 45 minutes in a press at 144° C. and compared with a similarly prepared and cured stock but containing, in place of Product A, an equal weight of a commercial sulfenamide delayed action accelerator. The test results obtained were as follows:

TABLE III

|  | Product A | Commercial Benzothiazolesulfenamide |
|---|---|---|
| Modulus of Elasticity in lbs./in.² at 300% Elongation | 2,243 | 2,206 |
| Tensile at break in lbs./in.² | 4,100 | 4,063 |
| Mooney scorch at 121° C | 74 | 43 |

Products D and E were tested in similar formulations containing N-nitrosodiphenylamine except that the stocks contained only 1.0 part of N-nitrosodiphenylamine and contained 1.5 parts of aromatic amine antioxidant. The test results obtained were as follows:

TABLE IV

|  | Product D | Product E | Commercial Benzothiazolesulfenamide |
|---|---|---|---|
| Modulus of Elasticity in lbs./in.² at 300% Elongation | 2,160 | 2,130 | 2,390 |
| Tensile at break in lbs./in.² | 4,100 | 4,250 | 3,975 |
| Mooney scorch at 135° C | 17.6 | 20.2 | 15 |

While the invention has been illustrated by use of elemental sulfur as the vulcanizing agent, other vulcanizing systems are applicable. Various N,N'-thioamines are known to be vulcanizing agents, as for example N,N'-dithiobis morpholine, and may be used in the practice of the invention. In general, any sulfur vulcanizing agent is suitable whether in the form of elemental sulfur or selenium or in the form of a sulfur compound which releases sulfur at vulcanizing temperature. The sulfur level can be varied to achieve particular objectives. The accelerators may be used alone or in admixture with other accelerators, as for example diphenyl guanidine, usually in amounts within the range of 0.1–5.0%.

Other sulfur vulcanizable diene rubbers can be used in the practice of the invention. These include styrene-butadiene copolymer rubbers, polybutadiene, isobutylene polymerized in the presence of a small amount of a diene hydrocarbon (butyl rubber) and the like.

It is intended to cover all changes and modifications of the examples of the invention herein chosen for purposes of disclosure which do not constitute departures from the spirit and scope of the invention.

This application is a continuation-in-part of application Serial No. 631,070, filed December 28, 1956, now U.S. Patent 2,875,208, granted February 24, 1959.

What is claimed is:

1. A process of vulcanizing rubber which comprises heating at vulcanizing temperature rubber having incorporated therein sulfur and an accelerating amount of a propynyl-2-benzothiazolesulfenamide.

2. A process of vulcanizing rubber which comprises heating at vulcanizing temperature rubber having incorporated therein sulfur and an accelerating amount of a sulfenamide having the structure

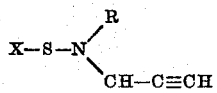

wherein R represents an alkyl group containing not more than five carbon atoms and X represents an aryl thiazole radical the aryl radical of which is selected from the benzene series.

3. A process of vulcanizing rubber which comprises heating at vulcanizing temperature rubber having incorporated therein sulfur and an accelerating amount of a sulfenamide having the structure

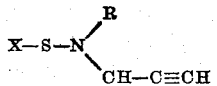

wherein R represents a saturated hydrocarbon radical containing not more than six carbon atoms and X represents an aryl thiazole radical the aryl radical of which is selected from the benzene series.

4. A process of vulcanizing rubber which comprises heating at vulcanizing temperature rubber having incorporated therein sulfur and an accelerating amount of a sulfenamide having the structure

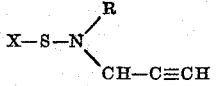

wherein R represents a branched chain lower alkyl group and X represents the 2-benzothiazole radical.

5. A process of vulcanizing rubber which comprises heating at vulcanizing temperature rubber having incorporated therein sulfur and an accelerating amount of N-isopropyl-N-(2-propynyl)-2-benzothiazolesulfenamide.

6. A process of vulcanizing rubber which comprises heating at vulcanizing temperature rubber having incorporated therein sulfur and an accelerating amount of 5-chloro-N-isopropyl-N-(2-propynyl) - 2 - benzothiazolesulfenamide.

7. A process of vulcanizing rubber which comprises heating at vulcanizing temperature rubber having incorporated therein sulfur and an accelerating amount of N-isopropyl-4-methyl-N-(2-propynyl) - 2 - benzothiazolesulfenamide.

8. A process of vulcanizing rubber which comprises heating at vulcanizing temperature rubber having incorporated therein sulfur and an accelerating amount of 6-ethoxy-N-isopropyl-N-(2-propynyl) - 2 - benzothiazolensulfenamide.

9. A rubber product vulcanized by the process of claim 1.

10. A vulcanizable rubber product having incorporated therein an accelerating amount of N-isopropyl-N-(2-propynyl)-2-benzothiazolesulfenamide.

11. A vulcanizable rubber product having incorporated therein an accelerating amount of 5-chloro-N-isopropyl-(2-propynyl)-2-benzothiazolesulfenamide.

12. A vulcanizable rubber product having incorporated therein an accelerating amount of 6 ethoxy-N-isopropyl-N-(2-propynyl)-2-benzothiazolesulfenamide.

References Cited in the file of this patent

UNITED STATES PATENTS

| 2,560,021 | Smith | July 10, 1951 |
| 2,875,208 | D'Amico | Feb. 24, 1959 |

Disclaimer 2,943,079. *John J. D'Amico, Nitro, W. Va.* VULCANIZING RUBBER WITH PROPYNYL SULFENAMIDES. Patent dated June 28, 1960. Disclaimer filed May 20, 1964, by the assignee, *Monsanto Chemical Company.*

Hereby enters this disclaimer to claims 1 and 9 of said patent.

[*Official Gazette August 18, 1964.*]